US009450387B2

(12) United States Patent
Faber et al.

(10) Patent No.: US 9,450,387 B2
(45) Date of Patent: Sep. 20, 2016

(54) PASSIVE ARC PROTECTION FOR MAIN BREAKER LINE SIDE POWER CONDUCTORS

(71) Applicant: Schneider Electric USA, Inc., Palatine, IL (US)

(72) Inventors: Timothy R Faber, Marion, IA (US); Cameron L Woodson, Cedar Rapids, IA (US)

(73) Assignee: Schneider Electric USA, Inc., Andover, MA (US)

( * ) Notice: Subject to any disclaimer, the term of this patent is extended or adjusted under 35 U.S.C. 154(b) by 3 days.

(21) Appl. No.: 14/501,946

(22) Filed: Sep. 30, 2014

(65) Prior Publication Data

US 2015/0015997 A1 Jan. 15, 2015

Related U.S. Application Data

(63) Continuation-in-part of application No. 13/452,145, filed on Apr. 20, 2012, now Pat. No. 8,922,977, and a continuation-in-part of application No. PCT/US2013/050797, filed on Jul. 17, 2013.

(51) Int. Cl.
*H01H 9/34* (2006.01)
*H02B 11/04* (2006.01)
(Continued)

(52) U.S. Cl.
CPC .................. *H02B 11/04* (2013.01); *H02B 1/20* (2013.01); *H02B 13/025* (2013.01); *H02B 1/56* (2013.01)

(58) Field of Classification Search
CPC .... H02B 1/14; H02B 11/167; H02B 13/025; H02B 7/01; H01H 9/34; H01H 9/342; H01H 9/0264; H01H 13/04; H05K 7/20; H05K 5/00; G06F 1/20
USPC ........ 361/600–602, 605, 608, 611, 614, 618, 361/622, 624, 627, 634, 641, 652, 656, 673, 361/679, 690; 218/34, 35, 149, 151, 218/155–158, 114; 335/8–11, 85, 102, 120, 335/160, 135, 132, 165–176, 201, 202; 200/50.1, 50.3, 50.17, 50.21, 50.23, 200/50.32, 306–308, 289, 400; 174/50, 58, 174/68.1, 520, 17 VA; 323/223.2; 454/184
See application file for complete search history.

(56) References Cited

U.S. PATENT DOCUMENTS 2,307,596 A * 1/1943 Ludwig .................. H01H 33/57
218/81
3,346,776 A * 10/1967 Olashaw .................. H02B 1/36
174/99 B (Continued)

FOREIGN PATENT DOCUMENTS

WO WO2013158723 10/2013

OTHER PUBLICATIONS

Extended European Search Report for EP Patent Application No. 15183655.8-1801, Dated Jan. 27, 2016, 8 pages.

*Primary Examiner* — Michail V Datskovskiy
(74) *Attorney, Agent, or Firm* — Locke Lord LLP (57) ABSTRACT

In a switchgear cabinet, the line side power conductors upstream of the main breaker are surrounded with arc attenuating/extinguishing channels and protective conduit in a location prior to the conductor's attachment to the main breaker. Thus, passive arc attenuation can be had prior to the breakers, Personal Protection Equipment (PPE) levels can be predicted and controlled, and the need for action by circuit breakers during an arcing event is substantially lessened.

14 Claims, 7 Drawing Sheets

(51) Int. Cl.
*H02B 13/025* (2006.01)
*H02B 1/20* (2006.01)
*H02B 1/56* (2006.01)

(56) References Cited

U.S. PATENT DOCUMENTS

| | | | | |
|---|---|---|---|---|
| 3,469,149 A | * | 9/1969 | Paape | H02B 1/21 174/100 |
| 3,621,339 A | * | 11/1971 | Hodgson | H02B 11/167 174/16.1 |
| 6,407,354 B1 | * | 6/2002 | Turner | H01H 9/342 218/155 |
| 6,410,844 B1 | * | 6/2002 | Bruner | H02B 13/025 174/17 VA |
| 6,924,721 B2 | * | 8/2005 | Afshari | H02B 1/06 218/157 |
| 7,199,318 B2 | * | 4/2007 | Buxton | H01H 9/52 200/306 |
| 7,329,813 B2 | * | 2/2008 | Josten | H02B 1/14 174/68.2 |
| 7,646,271 B2 | * | 1/2010 | Gottschalk | H01H 9/0264 200/50.32 |
| 7,952,857 B1 | | 5/2011 | Motley et al. | |
| 8,101,881 B2 | * | 1/2012 | Miller | H02B 13/025 218/157 |
| 8,242,395 B2 | * | 8/2012 | Josten | H02B 13/025 200/306 |
| 2005/0012578 A1 | * | 1/2005 | Afshari | H02B 1/06 335/202 |
| 2006/0120027 A1 | * | 6/2006 | Josten | H02B 1/14 361/624 |
| 2008/0239592 A1 | | 10/2008 | Roscoe et al. | |
| 2008/0264906 A1 | * | 10/2008 | Kozar | H01H 9/342 218/157 |
| 2009/0212022 A1 | * | 8/2009 | Josten | H02B 13/025 218/157 |
| 2012/0097413 A1 | | 4/2012 | Bugaris et al. | |
| 2012/0218067 A1 | | 8/2012 | Ballard et al. | |

\* cited by examiner

PASSIVE ARC PROTECTION FOR MAIN BREAKER LINE SIDE POWER CONDUCTORS

This Application claims priority to prior applications [US filed 20 Apr. 2012] Ser. No. 13/452,145 and [WO filed 17 Jul. 2013] PCT/US13/50797.

BACKGROUND OF THE INVENTION

1. Field of the Invention

The present invention relates generally to electrical distribution equipment and conductors contained within enclosures referred to herein generally as cabinets, although such enclosures need not have doors to benefit from the present invention. The invention relates more particularly to passively preventing, and controlling the effects of, unintended arc faults in electrical cabinets by use of a tunneled arc extinguisher system for an electrical enclosure on the incoming power conductors.

2. Discussion of the Related Art

The hazards of unexpected and/or uncontrolled arcing events, i.e. electrical discharge through a gas, also called arc faults, in an electrical cabinet are well known and include potential damage to equipment and harm to personnel in the operating environment caused by arc flash and arc blast, hereinafter referred to for simplicity as arc blast. Both passive and active arc control means are known in the art. Passive means include containment and directed venting of the arc blast energy and gasses out of the cabinet. Other passive means may include reinforcement of the cabinet structure in an effort to withstand the blast. Neither of the above passive methods limits fault duration. Of course, the quicker the arc is controlled the less harm is likely to be done by the arcing event.

Applicants have previously disclosed passive arc attenuation and extinguishing means in their prior applications [U.S. Ser. No. 13/452,145, filed 20 Apr. 2012; and WO International application number PCT/US13/50797, filed 17 Jul. 2013. The previous applications of the Applicant detailing passive arc extinguishing have largely focused on the circuit breaker-to-power bus connections. Both applications are incorporated herein by reference in their entirety.

Active arc control means usually include some form of sensing and a switching mechanism to control the current. Concerns with active means may include expense, nuisance trips, speed, and undetected system failures.

Of further concern is the lack of interruption selectivity of branched systems. In essence, whenever there is an arc fault on the line side of a breaker, the interruption device of the next highest level, i.e., e.g., the upstream breaker, fused transformer or the like, collectively referred to herein as "the next upstream circuit interruption device" or for brevity "the next upstream device;" must open the circuit to protect the power distribution infrastructure and downstream circuits/loads. For purposes of explanation the next upstream device will be referred to as a breaker, although, again, it will be understood that it could be a fused transformer or other type of circuit interrupting device. The problem is then of course that several branches, i.e. locations, may have their power interrupted by this action when the arc is only occurring at one location, i.e. branch.

Figure 1:
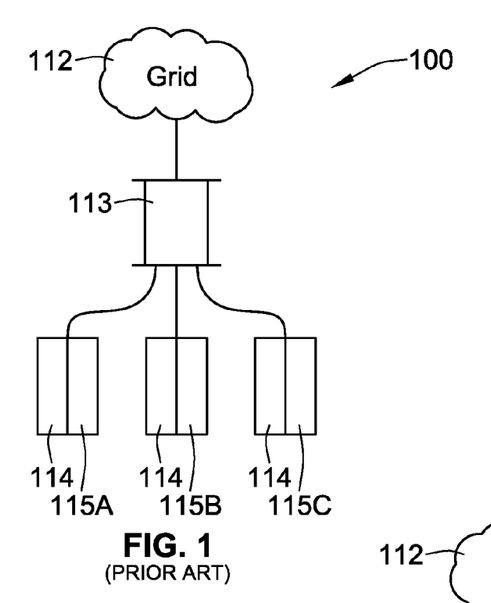
FIGS. 1 and 2 are block diagrams of a branched power system in the known art with switchgear cabinets with a main circuit breaker and branch circuit breakers, for illustration of certain principles of the present invention.

FIG. 1 depicts an exemplary power protection and distribution system, indicated generally by the numeral 100. Electrical power from the power grid 112 is transferred e.g. through a breaker 113; to three buildings 115A, 115B, 115C. Each building has its own distribution equipment, commonly referred to herein as gear or switchgear within a cabinet, collectively 114, as seen in more detail in FIG. 2. The switchgear cabinet 114 houses a main circuit breaker 116, a power distribution bus 118, and one or more downstream circuit breakers 120A, 120B, . . . 120N.

Figure 2:
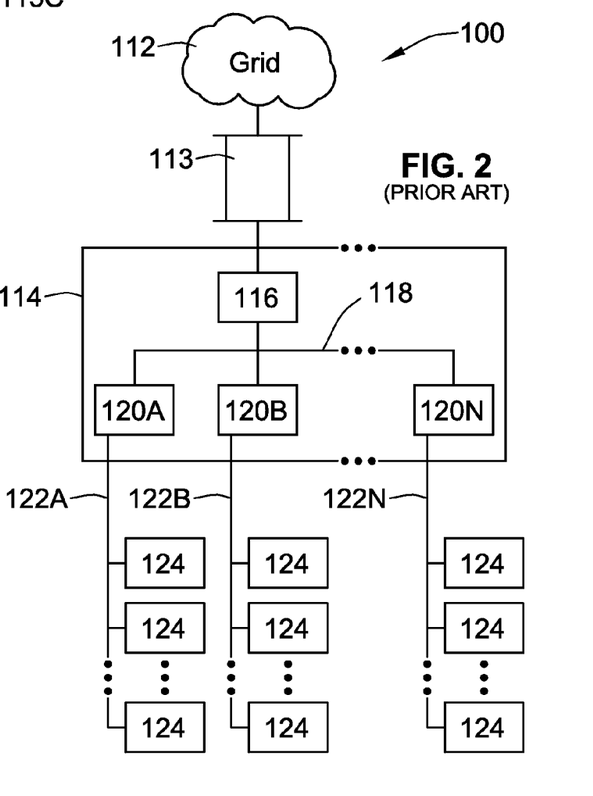

The main breaker 116 protects the entire facility, and is rated to pass the highest anticipated sustained current. The power distribution bus 118 may comprise, e.g., solid copper bars capable of conducting large currents. Each downstream circuit breaker 120A, 120B, . . . 120N is rated for a lower current, and distributes power on a separate power distribution circuit branch 122A, 122B, . . . 122N, respectively, to a plurality of electrical loads 124.

Any point upstream, i.e. on the line side, of the main breaker 116 has the breaker 113 as it's next upstream device. Because breakers (or interruption devices generally) only sense fault conditions on their load side, if an arc fault occurs on the line side of the main breaker 116, only the next upstream device, which here is the breaker 113, will open to save the downstream equipment. When breaker 113 opens (interrupts the current flow), all three buildings have their power interrupted. This is the selectivity problem. One can assume, in a branched architecture, the line side of any breaker will have a next upstream device.

SUMMARY OF THE INVENTION

Power comes in and must be distributed through the switchgear cabinet by the routing of various bus bars or cables to the various electrical distribution devices; including circuit interruption devices, typically circuit breakers (the two terms being used as interchangeable herein), establishing the various downstream circuit branches and loads. Due to the architectural and electrical considerations of cabinet construction, the runs of conductors must necessarily start, stop, and change direction. Such change involves uninsulated joints for conductor-to-conductor connections. Such joints are likely spots for arcing.

A quick, economical, passive mechanism for controlling and extinguishing arc events inside electrical cabinets would be welcome in the art. To that end, the present invention in its various aspects and embodiments teaches and provides an arc management system having arc-controlling surrounds for the conductors. One portion of the arc-controlling surrounds forms generally tubular "arc channels," surrounding uninsulated joints of the incoming power conductors to channel and control arc faults. One end of the arc channels may be joined to conduits surrounding further extensions of the conductors. Another end of the arc channels may terminate in a plenum, which can form a geometry and act as a chamber to hold the attenuated arc until it is extinguished. Since the arc-controlling structures can be considered as basically tubular, terminology common to curved surfaces may be used herein as an aid to explanation. The arc channel will lengthen the nascent arc and together with the associated plenum, if needed, attenuate the current and temperature until preferably the arc is extinguished. The arc channels and associated conduits can further provide barriers against unwanted solid conductor formation/infiltration.

Thus several advantages may be provided by the arc management system including arc prevention by physical barrier to inadvertent entry of shorting conductors such as dropped tools or vermin; and arc channeling with extinguishing or attenuation by the arc channels and associated exhaust channels which are sized, located and arranged so as to draw out and cool the arc thereby lessening its current and heat with attendant equipment and safety benefits.

In the realm of arc flash protection one of the most important concerns is the line side power conductors delivering grid power within the switchgear cabinet. These conductors are the source conductors that typically connect the main breaker of a piece of electrical distribution equipment to its upstream power source and provide for the vast majority of the power to be distributed by such equipment, in its least impeded state. Accordingly, these conductors typically represent the highest power availability by voltage, current and time; within the equipment, and hence the highest level of arc flash energy. Thus, the highest level of personal protective equipment (PPE) must be used in the operation or servicing of the equipment when dealing with these conductors and the distribution equipment connected thereto. It will be recognized that the PPE level will, in the absence of the present invention, be determined by the level of protection of the next upstream device above the main breaker of the cabinet. This next upstream device may sometimes be referred to as a "remote upstream device" since the device will by definition be outside of the cabinet.

Briefly, in calculating arc flash energy, there are two distinct mathematical methods of calculating the available arc flash energy present at a specific piece of equipment—both of which are detailed in Annex D of NFPA 70E.

One method, commonly referred to as the NFPA 70E equation for an arc flash in a cubic box, is:

$$E_{MB} = 1038.7 \, D_B^{-1.4738} \times t_A [0.0093 \, F^2 0.3453 \, F + 5.9673]$$

Where $E_{MB}$ is the arc flash energy, $D_B$ is the working distance (from Table 3 of IEEE 1584), $t_A$ is the duration of the arc, and F is the short-circuit (or fault) current. This equation uses inches for distance measurements, and gives results directly in calories per centimeter squared (cal/cm²). Upon understanding the invention it will be appreciated that $t_A$ and F will be controlled by the arc controlling structures of the present invention.

The present invention uses passive arc attenuation and extinguishing technology similar to that previously described in Applicants' prior applications (U.S. Ser. No. 13/452,145 and WO, International Application No. PCT/US13/50797, for controlling the arc faults and shall be referred to sometimes herein for simplicity as "arc block" technology or structure. The arc block technology of the present invention will be located above, i.e. upstream of, the main breaker of the switchgear cabinet around the uninsulated joints of the incoming conductors. The arc block technology at this location may provide dramatic benefits in safety and equipment reliability by reducing the chance of occurrence of an arc flash for these upstream conductors and reducing the intensity and duration of any arc flashes that do occur by choking the arc of its energy to achieve attenuation or extinguishment.

The extension of this passive arc block technology electrically upstream of the power connections to the Main Breaker, wherever it is physically located in the cabinet, may have several key benefits:

1. The arc block operates in a manner completely independent of the remote upstream device and is unaffected by its performance settings. The arc block will clear the fault regardless of the remote upstream device breaker settings or even if it fails to operate.
2. The arc in the equipment can be passively extinguished, leaving the main circuit breaker untripped, and the downstream loads on-line, thus enhancing electrical system reliability.
3. The Incident Energy rating of the arc block will be known beforehand across all operating voltages and short circuit currents and can be labeled directly from the factory. Thus, the need for an on-site arc flash study could be avoided.
4. Because the energy coming into the cabinet is now controlled by the arc block apparatus, the upper limit of arc flash energy available in the cabinet becomes a function of the main circuit breaker settings and the PPE can be adjusted accordingly.
5. An internal arcing fault which starts downstream of the main breaker cannot transfer to the line side conductors above the main circuit breaker because an arc block structure will provide a physical barrier to prevent the transfer.

Further, flow-through ventilation with exhaust channels can be integrated into the arc block systems for the equipment, the operation of the distribution gear can be cooler, resulting in better performance with less material expenditure. By combining arc management structure and ventilation structure, the benefits of both may be combined and utilized within the typically confined spaces of electrical enclosures. The arc block structure of the present invention can further be integrated with additional arc block structures located according to Applicants' previous teachings, i.e. at the backplane of the breakers, to achieve greater arc control.

In its various aspects the invention may provide a readily adaptable arc management and ventilation system with a passive arc attenuation upstream of the main breaker, especially in draw out breaker configurations.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The invention may best be understood by reference to the following description taken in conjunction with the accompanying drawings.

DETAILED DESCRIPTION OF THE ILLUSTRATED EMBODIMENTS

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Figure 3:
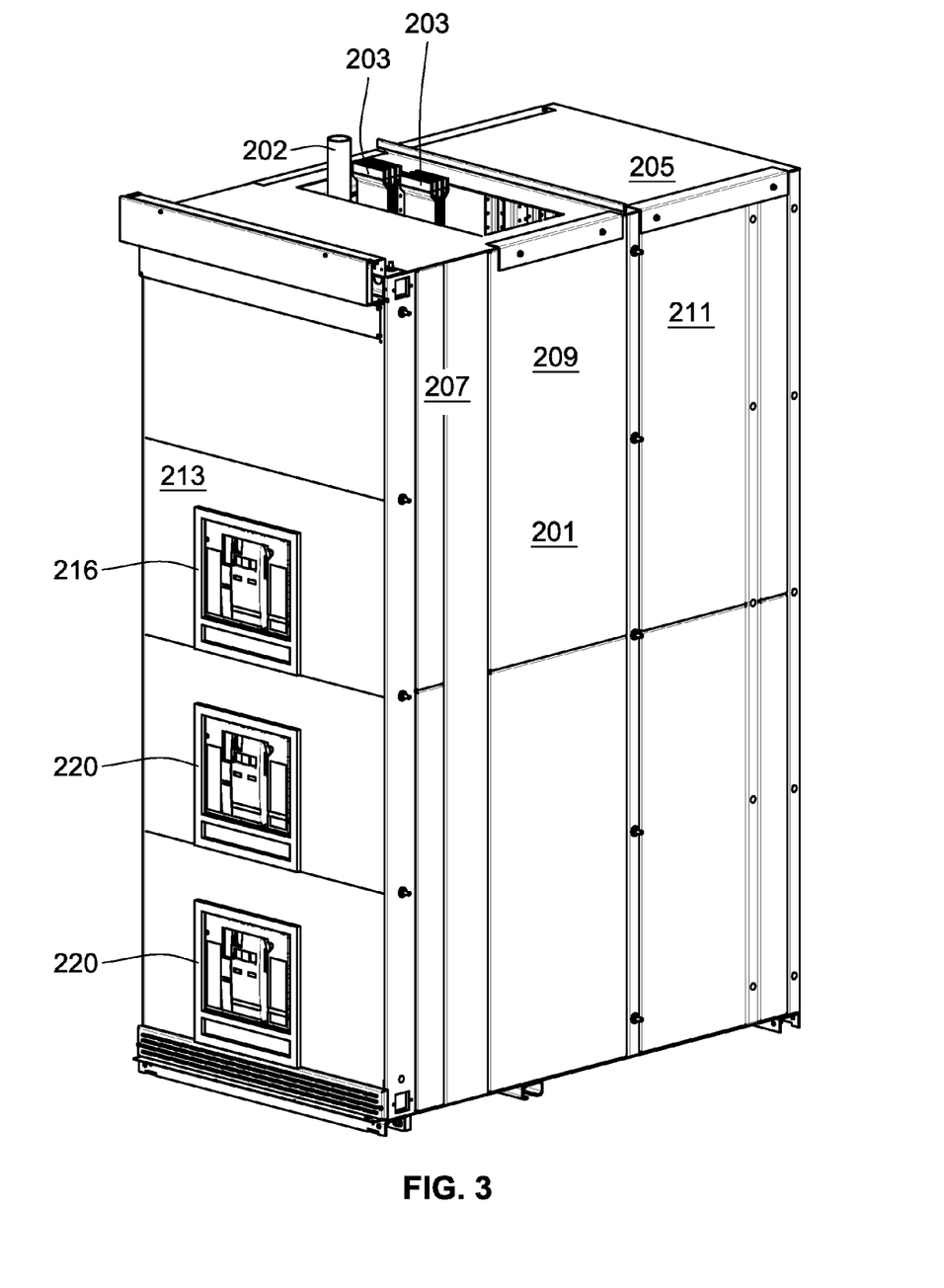
FIG. 3 is a perspective view of a switchgear cabinet with breaker section with an upstream main circuit breaker and two downstream branch breakers. An arc block structure (not shown) inside the cabinet is covering the incoming power conductors to the cabinet prior to/upstream of the conductors connection to the back of the main breaker, in accordance with an exemplary embodiment of the invention.

As seen in FIG. 3, a switch gear cabinet 201, will have line power entering the cabinet via power conductors 203 through its top panel 205. It will be appreciated by the person having ordinary skill in the art that cable or bus arrangements of various designs, entry points, breaker arrangements, etc. may be used with the present invention. The cabinet 201 is customarily divided into a forward breaker section 207, a middle bus section 209, and a rear cable section 211. As understood by the person having ordinary skill in the art, main breaker 216 accepts line power through its line side connectors then feeds power through its load side connectors to two branch breakers collectively 220, also of the draw out type, occupying the lower two drawers of the breaker section 207 and leading to separate load circuits, i.e. branches. The switch gear cabinet 201 may serve to protect various parts of the electrical equipment and conductors from the outside environment, as known in the art. Several breaker compartments are stacked vertically in the breaker section 207 so that each draw out breaker will have a structure for receiving its draw out chassis 117 (FIG. 4) to move the breaker in and out of contact with the electrical conductors feeding from the other two sections 209, 211. The main circuit breaker 216 is preferably but not necessarily a draw out breaker which occupies the top compartment or drawer 213 of the breaker section 207. An arc block structure 215 according to the present invention is located over the line side power conductors 203 on the upstream side of the main breaker 216 for passive arc control, that is, arc attenuation and/or extinguishing, as further explained below.

Figure 4:
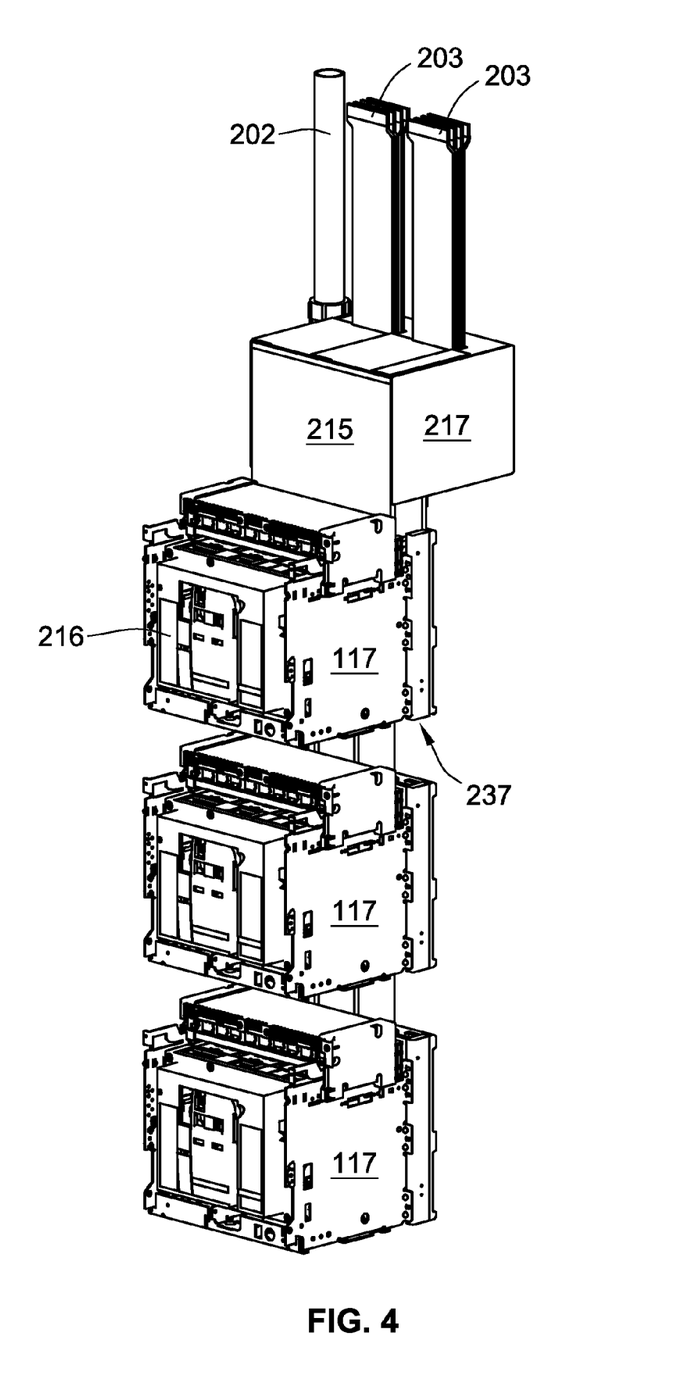
FIG. 4 is a detail view front perspective of the arc block structure and breakers of FIG. 3 with the cabinet removed.

As seen in FIG. 4, a right side perspective front view of the breakers within the breaker section 207 of the cabinet 201 and including the main breaker 216 and arc block structure 215, the arc block structure 215 includes a protective metal enclosure 217 through which the line side power conductors 203 pass. The metal enclosure 217 is a box open on at least one side to allow extension of a phase barrier structure 219 (best seen in FIGS. 5 and 6) over the line side power conductors 203, as further explained below. An exemplary vent pipe 202 for the arc block system extends out of the metal enclosure 217 and upwardly next to the line side power conductors 203. The vent pipe 202 may be connected and located on, or otherwise incorporated into the metal enclosure 217 in any suitable manner according to design dictates. A vent outlet from the arc block structure 215 is currently considered to be required for extinguishing an arc. The vent pipe 202 can be made of PVC, Epoxy-Glass, or similar non-conductive material. It will be noted that the backplane of each breaker is connected to the ventilation system ending in the vent pipe 202.

Figure 5A:
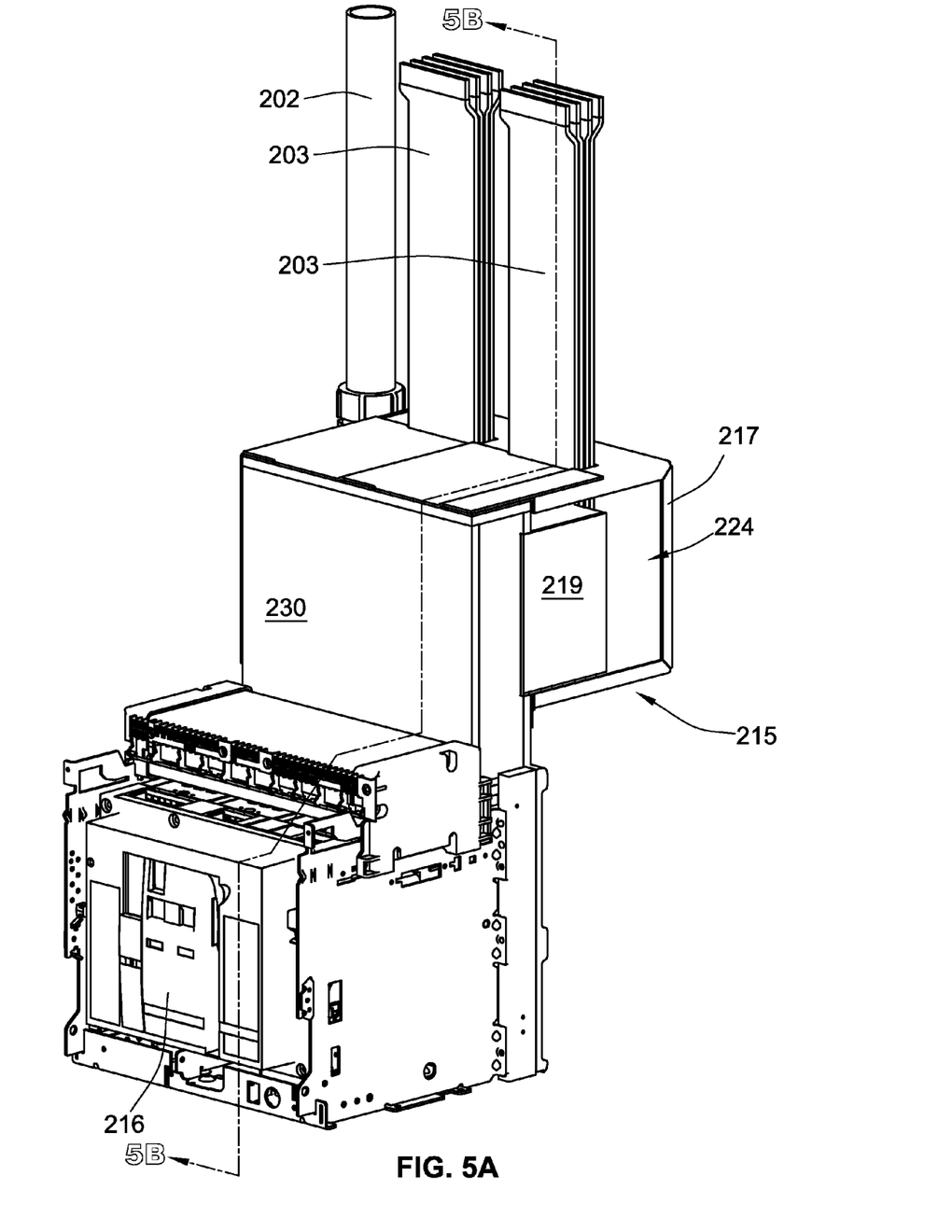
FIG. 5A shows the arc block structure with a side wall of its metal enclosure removed to more clearly show the phase barrier structure.
Figure 5B:
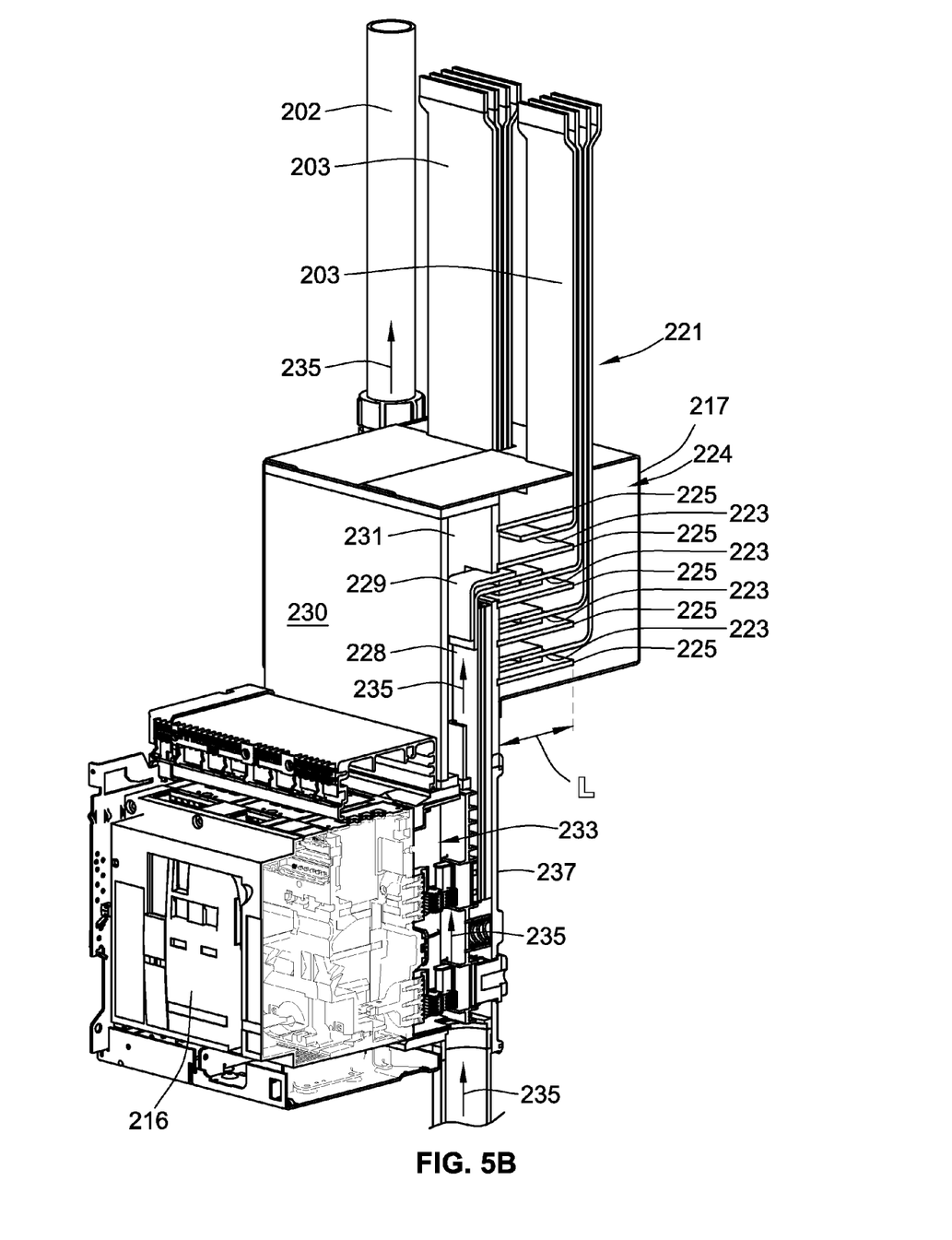
FIG. 5B is a sectioned view of FIG. 5A along line 5B-5B of FIG. 5A, showing further details of the phase barrier structure and plenum.

FIG. 5A shows the arc block structure 215 with a side wall of its metal enclosure 217 removed to more clearly show the phase barrier structure 219. FIG. 5B is a sectioned view of FIG. 5A showing further details of the phase barrier structure 219. While two line side power conductors 203 are illustrated, they are duplicate structures serving the same function and only one will be addressed for simplicity of description. The line side power conductor 203 containing four conductive busses, i.e. three phases and a neutral conductor, collectively 221, enters on the vertical orientation into a plenum 224 formed by the protective metal enclosure 217. The busses 221 then are separated into horizontal orientation by bends at different vertical levels to connect to horizontal run-backs 223 reaching the rear of the breaker section 207. As is known, the busses are typically epoxy coated for insulation everywhere except where a conductive joint needs to be formed, for instance as shown at their upper terminuses in FIGS. 3 and 4 or at the drop joints 229 shown in FIG. 5B and further explained below. The person having ordinary skill in the art will appreciate that support structure for the busses may not be shown here in order to simplify the illustrations.

Figure 5C:
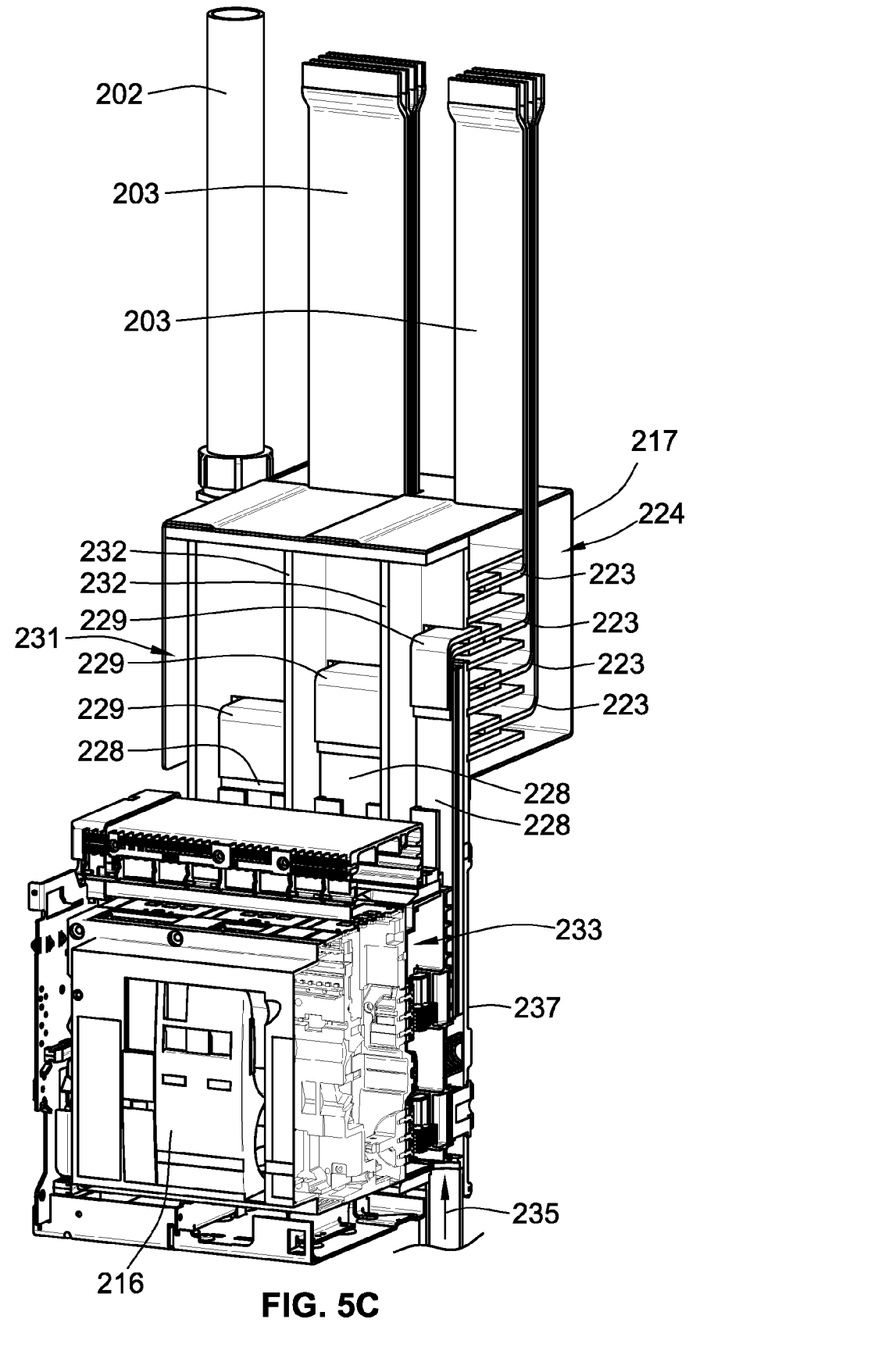
FIG. 5C is a view similar to FIG. 5B but with the front wall of the arc block structure 215 removed to show the details of the vertical conduit 231.
Figure 6:
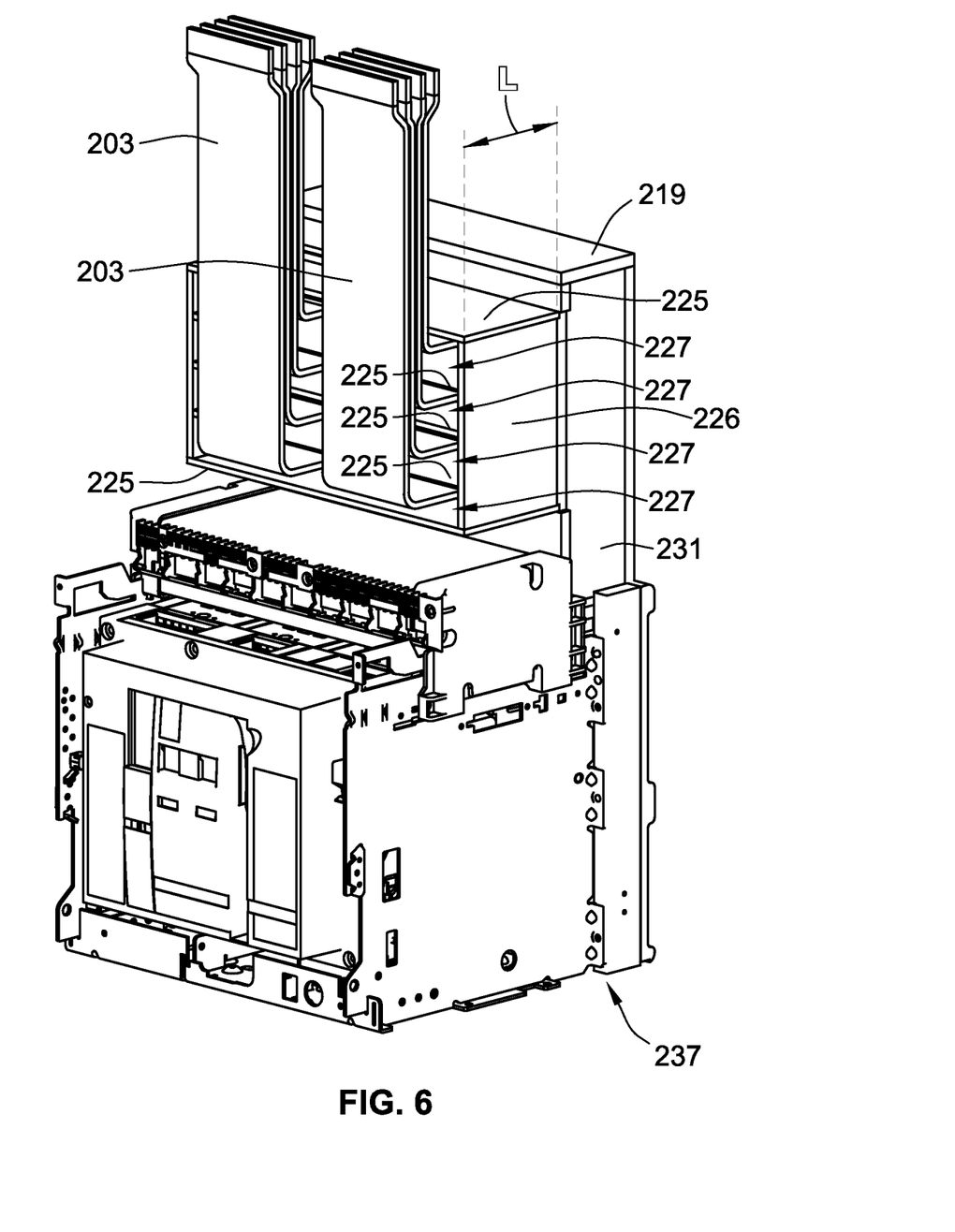
FIG. 6 is a view similar to FIG. 5A but with the arc block structure placed in reverse orientation to show details of the arc channels.

Further referring to FIG. 6, horizontal phase barriers 225 and phase barrier side walls 226 surround the horizontal run-backs 223 and respective conductive joints, thereby forming tubular arc channels 227 (FIG. 6) for the passive control of arcs and arc blast. Arc channels 227 will be of a length L and a cross section and overall volume which is sufficient to draw out any arc formed therein until it is attenuated to the point of extinguishing at a zero crossing, whether within the arc channel 227 (FIG. 6) or the plenum 224 (FIG. 5C). The plenum 224 may help cool the arc gases and may regulate the pressure of the arc blast to prevent restrikes.

In the sectioned views of FIGS. 5B and 5C, the horizontal conductor run backs 223 reach their phase drop joints 229 which connect to the next vertical conductor sections 228 which will return the conductor runs to a vertical orientation bringing the conductors in line with the rear of the breaker 216. In FIG. 5C the front wall 230 of the vertical conduit 231 has been removed to facilitate viewing of the phase drop joints 229 for each of phases A, B and C. At this point the vertical conductor runs are surrounded by a vertical conduit 231 including vertical phase barriers 232 between phases A and B, and between phases B and C, which may channel arc blast and provide additional protection around the uninsulated joints leading to the vertical runs of the conductors. The various parts of the arc block structure may be formed of any suitable nonconductive materials, e.g. whether ablative or nonablative, and held together at appropriate joining edges and fastened within the cabinet 201 with any suitable fasteners.

The vertical conduit 231 can be arranged to be contiguous with a breaker arc block structure 233 located at the back mold/back plane 237 of the main breaker 216 used to protect the power connections of the breaker 216. Arrows 235 (FIG. 5B) illustrate contiguous air flow between the breaker back mold arc block structure and the upstream arc block structure 215 into the vertical conduit 231 and through the arc channels 227 and out vent pipe 202 to aid in cooling the conductor path(s). It will be appreciated that additional tubing (not shown) or the like may be used to facilitate intake and exhaust for cooling air flow and may assume various arrangements such as, e.g., illustrated in Applicants' PCT/US13/50797 application.

It has been found that arc resistance is directly proportional to arc length and arc resistance is inversely proportional to arc (channel) cross section. Here in the present invention, we take advantage of lengthening the arc rather than shrinking the cross sectional area, thus allowing us to increase arc resistance to the point the arc self extinguishes. The conduits 231 and plenum areas 224 outside the arc channels 227 such as e.g. within enclosure 217 of the present invention further allow the arc products to cool to a lower temperature before exiting the cabinet. Arc length is desirably increased to where it may be self-extinguishing in less than one cycle. Overall length, indicated as "L" in FIGS. 5B and 6, and cross section or volume of the arc channels is sized such that arc current is limited and extinguished at the first zero crossing (natural or forced) of the second phase to cross zero. It will be appreciated that in some aspects of the invention, the desired sizing of length L and cross section may be interdependent such that the smaller the cross sectional dimension is, the shorter the length dimension L can be.

If an arc does occur, the arc channels are designed to prevent the arc from being sustainable by drawing out the arc along a certain geometry including a cross sectional area and a sufficient length L from the energized contact to the exhaust channel. This geometry, aided by the sublimation of materials forming the arc channel and exhaust channels during the arc event, forms a negative energy balance forcing the arc to extinguish and not reignite. Certain thermoset polyesters, thermoplastics or vulcanized fiber materials may be used as required for the desired sublimation. Thus, it will be appreciated that with fixed barriers of the proper materials forming the arc channels and the attached channels, e.g. the conduit 231, the present invention removes the need for clearing the arc by an active arc extinguishing device, as would be typical in the known art.

It will be appreciated that the phase barriers can be located between phases A-C, between any phase A-C and ground, and between rigid bars or insulated cables, especially around the uninsulated conductive joints of the phase conductors lacking an epoxy coating. By reduction or elimination of through-air exposure between energized and grounded surfaces of different potential, the phase barriers are designed to reduce the chance that a phase-to-ground or phase-to-phase arc occurs in the first place. The arc channels 227, best seen in FIG. 6, formed by the phase barriers 225 and side walls 226, provide mechanical and electrical separation between phases A-C and prevent sustained direct phase-to-phase arcing. Arc gases are routed in a direction which is perpendicular to the shortest path between conductors, and are kept separated until the length L has been achieved to promote self-extinguishing behavior. The gases are allowed to mix in the plenum 224 of the metal enclosure 217 which serves as a holding chamber for the arc gases at the end of the arc attenuating length L.

As will be appreciated, many variations of arc block structure may be utilized within a switchgear cabinet, including addition of the structures to various locations in the cabinet. Through-ventilation using inlets, conduits, and exhausts, can be implemented. The ventilation channels can lead into or from the front, back, bottom, top, or sides of the arc block structures.

The arc channels, plenum, and connected exhaust channels are helpful in passively attenuating and/or interrupting arcs that may occur at one or more of the conductor joints. For example, a system according to the present invention can conceivably passively interrupt an arc in less than one current cycle (16.66 milliseconds for 60 hertz). Based on industry tests that commonly allow a total test duration of 500 milliseconds or more, the reduction in duration is significant (by a factor of about 50) because it reduces the amount of plasma generated, the overall burn risk, and the amount of damage to electrical equipment. Further, the incident energy of the arc blast that would reach the user is also diminished by the fact the arc gas is enclosed and directed away by the present invention. In tests to date, about 50% of the incident energy reduction is due to reduced current/time and the other 50% is due to containment.

While particular embodiments, aspects, and applications of the present invention have been illustrated and described, it is to be understood that the invention is not limited to the precise construction and compositions disclosed herein and that various modifications, changes, and variations may be apparent from the foregoing description without departing from the scope of the invention as defined in the appended claims.

What is claimed is:

1. An electrical apparatus for passive management of arc faults, the apparatus comprising:
   a. a switchgear cabinet, the switchgear cabinet having therein:
   b. a main breaker for interrupting all downstream power through the cabinet,
   c. at least one branch breaker downstream of the main breaker for interrupting power to a branch circuit,
   d. a multiple phase power distribution bus for delivering grid power into the switchgear cabinet and attaching to the line side connections of the main circuit breaker, and
   e. an arc block structure located upstream of the line side connections of the main breaker, the arc block structure having phase barriers forming arc channels around a plurality of phases of the power distribution bus, the arc channels being of sufficient length and volume to attenuate an arc occurring therein.

2. The electrical apparatus of claim 1 wherein the arc channels are of sufficient length and volume to extinguish an arc occurring therein.

3. The electrical apparatus of claim 1 further comprising a metal enclosure at least partially surrounding the arc channels.

4. The electrical apparatus of claim 3 further comprising a vent pipe connected to the metal enclosure.

5. The electrical apparatus of claim 1 wherein the arc channels are connected to a plenum surrounding the plurality of phases.

6. The electrical apparatus of claim 5 wherein the plenum and arc channels each have an open end thereby providing flow-through ventilation.

7. The electrical apparatus of claim 1 wherein the power distribution bus is constructed of multiple sections producing changes in direction and orientation of the power conductor until it reaches the line side connections of the main breaker, and the arc channels have fixed barriers surrounding each phase of the electrical conductors at uninsulated conductor joints thereof.

8. The electrical apparatus of claim 1 wherein the barriers have a length and shape wherein each of the arc channels and the plenum define a geometry configured to achieve an arc extinguishment based on a known voltage and current carried by the enclosure.

9. The electrical apparatus of claim 1 wherein the main breaker is a draw out breaker.

10. A method for limiting arc blast, extinguishing arcs, and ventilating conductors in an electrical enclosure containing electrical circuit conductors and a main circuit interrupting device connected to the electrical current conductors, the method comprising:
forming arc channels, respectively, around each electrical circuit conductor connected above the main circuit interrupting device, the arc channels having a first end and a second end;
the arc channels having a length sufficient to achieve an arc voltage attenuation such that an interruption of an arc current occurs within a predetermined time period; and
coupling the first end to a conduit, the conduit providing protective channels surrounding each phase of the electrical current conductors;
coupling the second end to a plenum, the plenum having a volume sufficient to achieve arc plasma cooling rates sufficient to extinguish the arc in accordance with a predetermined test requirement.

11. An arc management system with a passive arc attenuator, comprising:
a) electrical equipment having exposed electrical conductors;
b) a cabinet separating the electrical equipment from an outside environment;
c) an arc channel within the cabinet and surrounding the electrical conductors upstream of a main circuit breaker of the cabinet,
d) the arc channel forming a shape and volume sufficient for the attenuation of an arc therein.

12. The arc management system of claim 11 wherein the arc channel is surrounded by a metal enclosure within the cabinet.

13. The arc management system of claim 11 wherein the arc channel is a channel of sufficient length and cross section to attenuate the arc.

14. The arc management system of claim 11 wherein the arc channel is a channel of sufficient length and cross section to extinguish the arc.

* * * * *